United States Patent

Burkhardt et al.

US005635437A

[11] Patent Number: 5,635,437
[45] Date of Patent: Jun. 3, 1997

[54] METHOD FOR PREPARING METALLOCENE CATALYST SYSTEMS

[75] Inventors: Terry J. Burkhardt, Kingwood; William B. Brandley, Deer Park, both of Tex.

[73] Assignees: Exxon Chemicals Patents, Inc., Wilmington, Del.; Hoechst Aktiengesellschaft, Frankfurt, Germany; a part interest

[21] Appl. No.: 506,995

[22] Filed: Jul. 28, 1995

[51] Int. Cl.⁶ .................................................. C08F 64/642
[52] U.S. Cl. .......................... 502/104; 502/103; 502/117; 502/108; 526/127; 526/160; 526/943
[58] Field of Search .................................... 502/104, 108, 502/103, 117; 526/943

[56] References Cited

U.S. PATENT DOCUMENTS

| | | |
|---|---|---|
| 5,145,819 | 9/1992 | Winter et al. .................. 502/117 |
| 5,198,401 | 3/1993 | Turner et al. .................. 502/155 |
| 5,235,081 | 8/1993 | Sangokoya ..................... 556/179 |
| 5,248,801 | 9/1993 | Sangokoya ..................... 556/179 |
| 5,427,992 | 6/1995 | Graefe et al. .................. 502/111 |

FOREIGN PATENT DOCUMENTS 2033805  8/1991  Canada.

*Primary Examiner*—Mark Nagumo
*Attorney, Agent, or Firm*—C. Paige Schmidt

[57] ABSTRACT

This invention is generally directed toward a method for producing metallocene catalyst systems. Specifically, the method involves removing solid impurities from a solution of activated metallocene wherein activation has the effect of solubilizing the metallocene but not the impurities. The resulting catalyst system is higher in activity and produces polymer having excellent particle morphology with little or no reactor fouling.

8 Claims, No Drawings

METHOD FOR PREPARING METALLOCENE CATALYST SYSTEMS

FIELD OF THE INVENTION

This invention relates generally to an improved method for preparing metallocene catalyst systems. Particularly, this invention provides a method for quickly and easily removing impurities such as inorganic salts by exploiting the solubility difference between the active catalyst system and catalyst system impurities.

BACKGROUND

Metallocene catalyst systems are extensivily used in a variety of polymerization systems. Typically, these systems include two components, the metallocene component and activator component. A problem associated with metallocene catalyst systems is the presence of impurities which detrimentally effect catalyst performance and polymer particle morphology. Among the most common impurities associated with the metallocene component are metal salts which are either formed or remain unreacted during the metallocene synthesis. The detrimental effect of these impurities is generally not recognized.

Removing these impurities or preventing their formation during metallocene synthesis presents a number of difficulties such as reduced yield of metallocenes, use of large volumes of solvent, and an overall increase in expense. For example, U.S. Pat. No. 5,302,733 describes a lengthy synthesis involving filtration, extraction, separation, evaporation, and/or recrystallization steps to isolate racemic metallocene isomers of interest. The metallocene compound recovered is reported as being substantially free of alkali metal salt by-product. Removing metal salts and other contaminants after metallocene compound synthesis would be difficult because many metallocene compounds along with the impurities typically associated with such compounds are sparingly soluble or less in hydrocarbon solvents thus making purification impractical. Therefore, there exists a need for a simple post synthesis method of purification which enhances polymerization performance and is cost effective.

SUMMARY

This invention generally provides a quick, simple, and efficient method for removing impurities associated with metallocene catalyst system components. In particular, this method involves the exploitation of solubility differentials between activated metallocene catalyst systems and their associated impurities, particularly inorganic metal salts. Thus, there is provided a method for producing a metallocene catalyst system, said method comprising the steps of: 1) providing one or more metallocene compounds; 2) activating the metallocene compound(s) in a solvent to form a metallocene catalyst system solution; and 3) removing insoluble impurities. There is also provided a method for producing a metallocene catalyst system, said method comprising the steps of: (a) activating one or more metallocene compounds having limited solubility in a hydrocarbon solvent thereby solubilizing the metallocene; (b) filtering the solution; and (c) recovering activated metallocene catayst system. There is also provided a method for producing a supported metallocene catalyst system said method comprising the steps of: (a) combining in a hydrocarbon, one or more metallocene compounds having limited solubility with an activator thereby forming a solution; (b) removing solid components from the solution; (c) combining the solution with a support material; and (d) recovering active, supported metallocene catalyst system. Also provided is a method for polymerizing one or more olefin monomers using the catalyst system described above.

DETAILED DESCRIPTION OF PREFERRED EMBODIMENTS

We have discovered a simple and cost effective method for purifying metallocene catalyst systems. This method is particularly effective in the removal of metal salt impurities formed during metallocene synthesis. Specifically, we have discovered that upon activation, metallocenes become more soluble in hydrocarbon solvents but the impurities remain insoluble and can easily be removed. Thus, this method is particularly useful for the purification of metallocene compounds having limited solubility, and is preferably utilized for purification of metallocene compounds having a bis-indenyl type ligand structure and bridged bis-indenyl type metallocenes.

As used herein, a metallocene compound having "limited solubility" includes metallocene compounds that are sparingly soluble or less in hydrocarbon solutions. The term "sparingly soluble" is defined {by the United States Pharmacopeia solubility classification as found in Grant and Hackh's Chemical Dictionary, 5th ed. (1987 McGraw-Hill Inc.) p. 541 (herein fully incorporated by reference)} as requiring 30–100 parts of solvent per part of solute. Less soluble metallocenes include those that are slightly soluble (requiring 100–1000 parts of solvent per part of solute), very slightly soluble (requiring 1000–10,000 parts of solvent per part of solute) and practically insoluble and insoluble (10,000 or more parts of solvent per part of solute).

The impurities generally comprise inorganic metal salts such as LiCl, and $MgCl_2$ and transition metal salts such as $ZrCl_4$ and $HfCl_4$. Any method of removing or separating impurities from the activated, metallocene catalyst system may be used including filtration, decantation and/or centrifugation.

As used herein, "metallocene" and "metallocene catalyst component" mean those bulky ligand transition metal compounds represented by the formula:

$$Cp_mMR_nX_q$$

wherein Cp is a cyclopentadienyl ring or derivative thereof, M is a Group 4, 5,or 6 transition metal and/or a metal from the lanthanide or actinide series, R is a hydrocarbyl group or hydrocarboxy group having from 1 to 20 carbon atoms, X is a halogen, and m=1–3, n=0–3, q=0–3, and the sum of m+n+q is equal to the oxidation state of the transition metal.

The metallocene may be bridged or unbridged, and include heteroatoms in the structure. In addition, one or more bulky ligands may be π-bonded to the transition metal atom. Other ligands may be bonded to the transition metal, for example, a leaving group, such as but not limited to hydrocarbyl, hydrogen or any other univalent anionic ligand. Non-limiting examples of metallocene catalyst compounds, catalyst components and catalyst systems are discussed in for example, U.S. Pat. Nos. 4,530,914, 4,952,716, 5,124, 418, 4,808,561, 4,897,455, 5,278,264, 5,278,119, 5,304,614 all of which are herein fully incorporated by reference. Also, the disclosures of EP-A-0 129 368, EP-A-0 591 756, EP-A-0 520 732, EP-A-0 420 436, WO 91/04257 WO 92/00333, WO 93/08221, and WO 93/08199 are all fully incorporated herein by reference. The preferred transition metal component of the catalyst of the invention are those of Group 4, particularly, zirconium, titanium and hafnium. The transition metal may be in any oxidation state, preferably +3 or +4 or a mixture thereof.

In general the solubility of metallocenes varies and is difficult to predict. Factors that affect metallocene solubility include the ligand structure and transition metal. Some metallocenes such as the bis indenyl metallocenes are of limited solubility or less in hydrocarbon solvents such as pentane, hexane, heptane, isooctane, benzene, toluene, xylene and cyclohexane to name a few.

Upon activation, metallocenes become more soluble, however, impurities such as metal salts remain insoluble and can at this point be easily removed. Thus the utility of this invention is of particular importance when used with those metallocene compounds which contain impurities and where the impurities are difficult to remove.

Particularly preferred metallocenes comprise a Group 4, 5, or 6 transition metal, biscyclopentadienyl derivatives, preferably bis-indenyl metallocene components having the following general structure:

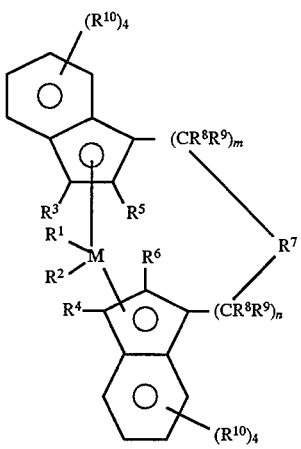

wherein $M^1$ is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconlure and hafnium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ -arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

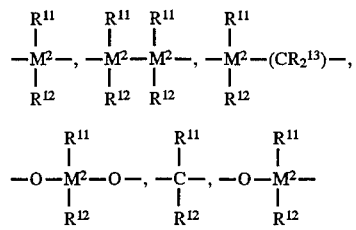

=$BR^{11}$, =$AlR^{11}$, —Ge—, —Sn—, —O—, —S—, =SO, =$SO_2$, =$NR^{11}$, =CO, $PR^{11}$, or =$P(O)R^{11}$;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroalkyl group, preferably a $C_6$–$C_{20}$ fluoroalkyl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, R12 and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

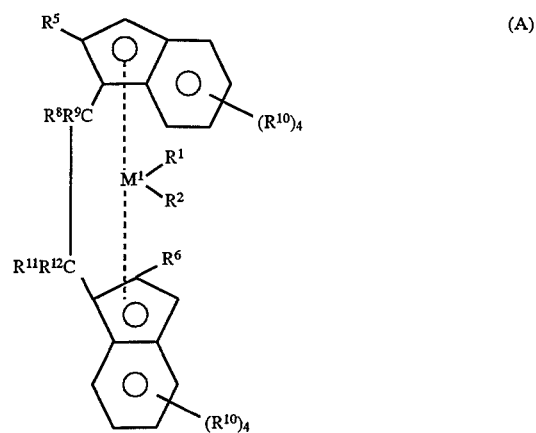

(A)

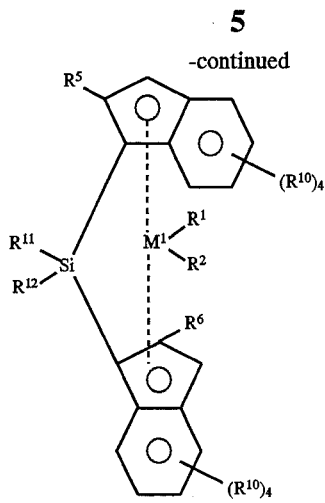

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

The chiral metallocenes are used as a racemate for the preparation of highly isotactic propylene polymers.

It is also possible to use the pure R or S form. An optically active polymer can be prepared with these pure stereoisomeric forms. It is preferred that the meso form of the metallocenes be removed to ensure the highest stereoregularity in the polymerization.

Separation of the stereoisomers can be accomplished by known literature techniques. For special products it is also possible to use rac/meso mixtures.

Generally, the metallocenes are prepared by a multi-step process involving repeated deprotonations/metallations of the aromatic ligands and introduction of the bridge and the central atom by their halogen derivatives. The following reaction scheme illustrates this generic approach:

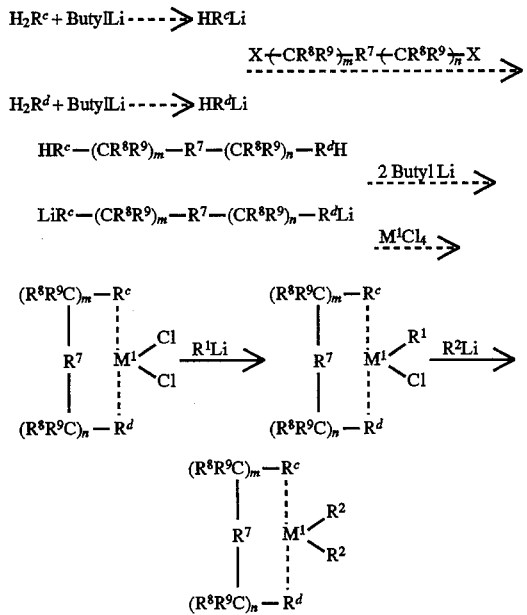

X = Cl, Br, I or O-tosyl;

(B)

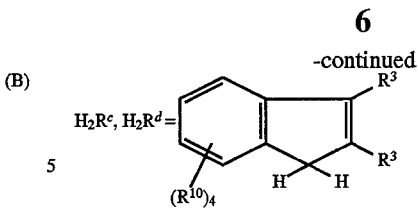

The *Journal of Organometallic Chem.*, volume 288, (1958), pages 63–67, and EP-A- 320762, (both herein fully incorporated by reference) describes the preparation of the above metallocenes.

Illustrative but non-limiting examples of metallocenes include:
Dimethylsilandiylbis(2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl) ZrCl$_2$;
Dimethylsilandiylbis(2-ethyl-4-phenyl-1-indenyl)ZrCl$_2$;
Dimethylsilandiylbis(4-naphthyl-1-indenyl)ZrCl$_2$,
Phenyl(Methyl)silandiylbis(2-methyl-4-phenyl-1-indenyl) ZrCl$_2$,
Dimethylsilandiylbis(2-methyl-4-(1-naphthyl)-1-indenyl) ZrCl$_2$,
Dimethylsilandiylbis(2-methyl-4-(2-naphthyl)-1-indenyl) ZrCl$_2$,
Dimethylsilandiylbis(indenyl)ZrCl$_2$,
Dimethylsilandiylbis(2-methyl-4,5-diisopropyl-1-indenyl) ZrCl$_2$,
Dimethylsilandiylbis(2,4,6-trimethyl-1-indenyl)ZrCl$_2$,
Phenyl(Methyl)silandiylbis(2-methyl-4,6-diisopropyl-1-indenyl)ZrCl$_2$,
1,2-Ethandiylbis(2-methyl-4,6-diisopropyl-1-indenyl) ZrCl$_2$,
1,2-Butandiylbis(2-methyl-4,6-diisopropyl-1-indenyl) ZrCl$_2$,
Dimethylsilandiylbis(2-methyl-4-isopropyl-1-indenyl) ZrCl$_2$,
Dimethylsilandiylbis(2-methyl-4-t-butyl-1-indenyl)ZrCl$_2$,
Phenyl(Methyl)silandiylbis(2-methyl-4-isopropyl-1-indenyl)ZrCl$_2$,
Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl) ZrCl$_2$,
Phenyl(Methyl)silandiylbis(2-methyl-4,5-benzo-1-indenyl) ZrCl$_2$,
Dimethylsilandiylbis(2-methyl-4,5-(methylbenzo)-1-indenyl)ZrCl$_2$,
Phenyl(Methyl)silandiylbis(2-methyl-4,5-(tetramethylbenzo)-1-indenyl)ZrCl$_2$,
Dimethylsilandiylbis(2-methyl-a-acenaphth-1-indenyl) ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(Methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(Methyl)silandiylbis(2-methyl-5-isobutyl-1-indenyl) ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$, and the like.

The metallocene catalyst components of this invention are described in detail in U.S. Pat. Nos. 5,149,819, 5,243,001, 5,239,022, 5,296,434 and 5,276,208 each of which is herein fully incorporated by reference.

The metallocene compounds discussed above are activated to form the metallocene catalyst system. The metallocene activator may be any compound or component which can activate a bulky ligand transition metal compound or a metallocene compound as defined above. Preferably the metallocene is of limited solubility in hydrocarbon solvent but becomes more soluble upon activation, i.e., soluble (10–30 parts of solvent required per part of solute) or freely soluble (1–10 parts of solvent per part of solute) or very soluble (less than 1 part of solvent per part of solute). Alumoxane may be used as the activator as well as ionizing activators, neutral or ionic. For example, compounds such as tri(n-butyl)ammonium tetrakis(pentaflurophenyl)-boron, which ionize the neutral metallocene compound, may be used as the activator. Examples of ionizing activators and methods of their production and use may be found in U.S. Pat. Nos. 5,153,157; 5,198,401; 5,241,025; and 5,278,119, herein fully incorportated by reference.

Alumoxane is preferably represented by the formula: $R—(Al(R)—O)_n—AlR_2$ for oligomeric linear alumoxanes and $(—Al(R)—O—)_m$ for oligomeric cyclic alumoxane wherein n and m are 1 to 40, preferably 3 to 20, and R is a $C_{1-8}$ alkyl group or R is an $C_{6-18}$ aryl group, or hydrogen, preferably a methyl group, or R can be mixtures of alkyl and aryl substituents. Alumoxane or methylalumoxane can be prepared by a variety of known processes such as that illustrated in, for example, U.S. Pat. No. 4,665,208, incorporated herein by reference.

Generally, activation is carried out in a solution containing dissolved activator. When alumoxane is used as the activator, the concentration of alumoxane in the solution may range from about 1% by weight up to the saturation limit, preferably, from about 5% to about 40% by weight in each case based on the entire solution. The metallocene is dissolved in this solution and the concentration of metallocene in solution may be up to the saturation limit. The preferred ratio of metallocene to alumoxane for unsupported catalyst systems is in the range of from about 1 to about 10,000 moles of metallocene per mole of alumoxane, more preferably fore about 1 to about 1000 moles of metallocene per mole of alumoxane.

For supported catalyst systems, the ratio of the metal of the alumoxane component to the transition metal of the metallocene component is preferably in the range of from about 20:1 to about 800:1, more preferably from about 50:1 to about 600:1, and most preferably from about 100:1 to about 300:1. The time required for activation may be about 5 minutes or more, preferably, about 5 to about 60 minutes at a temperature ranging from about $-78°$ C. to about $100°$ C., preferably about $0°$ C. to about $40°$ C.

Alternatively, ionic activators may be used as described above in which case the activation may be carried out in solution at a temperature ranging from about $-100°$ C. to about $300°$ C., preferably about $0°$ C. to about $100°$ C. The time for reaction may range from about 10 seconds to about 60 minutes depending upon variables such as reaction temperature and choice of reactants.

Suitable solvents for dissolving the activator and activated metallocene include any inert hydrocarbon including aromatic and aliphatic hydrocarbons. Toluene and xylene are particularly preferred solvents.

Once the metallocene is contacted with the activator solution, insoluble impurities are filtered or otherwise seperated from the solution. Any type of filter capable of removing metal salts and/or other metallocene impurities may be used. For example, about a 30 micron to 60 micron filter may be used, but a smaller or larger filter may be used depending on the particle size of the impurities. Alternatively, the solid impurities may be allowed to settle and the solution of activated metallocene catalyst system can be decanted. Centrifugation may also be used to aid seperation.

The impurities associated with metallocene catalysts include in particular, metal salts such as LiCl and $MgCl_2$ and transition metal salt impurities such as unreacted $ZrCl_4$. The choice of solvent and solvent amount used for metallocene activation should not solubilize the impurity sought to be removed. Generally, metallocene asociated transition metal salt impurities will not be soluble in hydrocarbon solvents.

In the preferred embodiment the purified catalyst system of the invention is supported. Preferably the metallocene is activated with the alumoxane in solution, the solid impurities removed, and the activated metallocene applied to the support. Examples of supporting catalyst systems such as those provided herein are described in U.S. Pat. Nos. 4,937, 217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706 and U.S. patent application Ser. Nos. 138,818, filed Oct. 14, 1993, U.S. Pat. No. 5,466,649, 170,108, abandoned filed Dec. 20, 1993, 182, 244, filed Jan. 14, 1994 abandoned, 233,668, filed Apr. 26, 1994 pending, 265,533, filed Jun. 24, 1994 abandoned, 265,532, filed Jun. 24, 1994 now abandoned, 271,598, filed Jul. 7, 1994 now U.S. Pat. No. 5,468,702, 287,322, filed Aug. 8, 1994 now abandoned (all fully incorporated herein by reference).

The support material can be any support material, preferably a porous support material, such as for example, talc, inorganic oxides, inorganic chlorides, for example magnesium chloride and resinous support materials such as polystyrene or polystyrene divinyl benzene polyolefins or polymeric compounds or any other organic support material or mixtures thereof.

The preferred support materials are inorganic oxide materials which include those of Groups 2, 3, 4, 5, 13 or 14 metal oxides. In a preferred embodiment, the catalyst support materials include silica, alumina, silica-alumina, and mixtures thereof. Other inorganic oxides that may be used either alone or in combination with the silica, alumina or silica-alumina are magnesia, titania, zirconia, and the like.

The supported purified catalyst system may also be prepolymerized using one or more alpha olefins. The prepolymerization may be carded out batchwise or continuously in gas, solution, or slurry phase. Any alpha-olefin monomer or combination of monomers may be used but preferably, the monomer and/or comonomer contains from 2 to about 20 carbon atoms, more preferably from 2 to about 8 carbon atoms, most preferably the monomer and/or comonomer comprises ethylene or propylene. Details regarding prepolymerization may be found in U.S. Pat. No. 4,923,833 and 4,921,825 and EP-B-0279 863, published Oct. 14, 1992 all of which are incorporated fully herein by reference.

In some embodiments it may be preferable to apply the catalyst components to the support material such that a homogeneous supported catalyst system is obtained. In other words, the components should be evenly distributed within and upon the support particles. The volume of catalyst component solution contacted with the support material has been found to affect homogeneity. Preferably, the volume of catalyst component solution is in the range of from above one times the total pore volume of the porous support to about 10 times the total pore volume of the porous support. Preferably vigorous stirring or agitation is used when the catalyst component solution is contacted with the support material.

The procedure for measuring the total pore volume of a porous support is well known in the art. Details of one of these procedures can be found in Volume 1, *Experimental Methods in Catalytic Research*, 67–96 (Academic Press, 1968). This preferred method, which is the one used herein, involves the use of a classical BET apparatus for nitrogen absorption. Another method well known in the art is described in Innes, *Total Porosity and Particle Density of Fluid Catalysts By Liquid Titration*, Vol 28, No.3, Analytical Chemistry 332–334 (March 1956).

Two or more metallocene catalyst components may be used to make the catalyst system of the present invention. In addition, scavengers or other additives such as antistatic agents may be used.

The catalyst system of this invention is suited for the polymerization of monomers and optionally comonomers in any polymerization process, including gas, slurry, and solution phase processes as well as high pressure autoclave processes. In the preferred embodiment, a gas phase or slurry phase process is used. Preferably, the monomer and/or comonomer contains from 2 to about 20 carbon atoms, more preferably from 2 to about 8 carbon atoms, most preferably the monomer and/or comonomer comprises ethylene or propylene.

In a gas phase polymerization process, a continuous cycle is typically used where in one part of the reactor cycle, a recycle stream or fluidizing stream is heated by the heat of polymerization. This heat is removed using a cooling system in another part of the cycle. (See for example, U.S. Pat. Nos. 4,543,399, 4,588,790, 5,028,670, 5,352,749, and U.S. application Ser. No. 065,250, filed May 20, 1993 all of which are fully incorporated herein by reference.)

Generally, in a gas fluidized bed polymerization process, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

A slurry polymerization process generally uses pressures in the range of about 0.48 kPa to about 240 kPa and above. Temperatures typically range from –60° C. to about 280° C. A suspension of solid particulate polymer is formed in a liquid polymerization medium to which monomers and comonomers along with catalyst are added. The liquid medium may be an alkane or cycloalkane, or an aromatic hydrocarbon such as toluene, ethylbenzene or xylene. The liquid medium selected should be liquid under the conditions of polymerization and it should also be relatively inert. The preferred liquid mediums are hexane or isobutane. Alternatively, a slurry polymerization may be used wherein the olefin monomer serves as the polymerization diluent. Generally this type of polymerization is carded out using a pressure of from about 67 kPa to about 6,700 kPa, most preferably from about 276 kPa to about 4,137 kPa. The diluent is maintained at a temperature of from about –10° C. to about 150° C., preferably from about 20° C. to about 100° C., and most preferably from about 30° C. to about 90° C.

In the preferred embodiment, the catalyst system is used in a bulk liquid propylene slurry or gas phase polymerization or copolymerization reaction involving the polymerization of propylene with ethylene or one or more of the alpha-olefin monomers having from 4 to 20 carbon atoms, preferably 4–12 carbon atoms such alpha-olefin comonomers of butene-1, pentene-1, 4-methylpentene-1, hexene-1, octene-1, decene-1, and cyclic olefins such as styrene. Other suitable monomers include dienes, norbornene, acetylene and aldehyde monomers. Most preferably the comonomer is ethylene or propylene.

EXAMPLES

The following examples are presented to provide a better understanding of the present invention, including representative advantages thereof.

All experiments were carded out in nitrogen purged dry boxes. All solvents were purchased from commercial sources and were nitrogen purged and dried over activated molecular seives. Aluminum alkyls were purchased as 20–25 wt. % solutions from commercial sources. Methylalumoxane (MAO) was purchased from commercial sources as a 10 or 30 wt. % solution in toluene. The silica used was Davidson 948 dehydrated in a nitrogen stream at the temperature indicated.

The polymerization procedure was as follows. In a clean, dry two liter autoclave which has been flushed with propylene vapor, triethylaluminum (TEAL) scavenger (0.8 ml, 1.5 M) was added. The reactor was closed and filled with approximately 800 ml liquid propylene. The catalyst system was added by washing with propylene (200 mls) at 35° C. and the temperature rapidly raised to the desired polymerization temperature of 65° C. After thirty minutes, the reactor was cooled and the excess propylene vented. The polymer was then removed and dried.

Molecular weight determinations were made by Gel Permeation Chromatography (GPC) according to the following technique. Molecular weights and molecular weight distributions were measured using a Waters 150C gel permeation chromatograph equiped with a Shodex (Showa Denko) AT-806MS columns and a differential refractive index (DRI) detector operating at 145° C. with 1,2,4-trichlorobenzene as the mobile phase at a 1.0 ml/min flow rate. The sample injection volume was 300 microliters. The columns were calibrated using narrow polystyrene standards to generate a universal calibration curve. The polypropylene calibration curve was established using k=8.33×10$^{-5}$ and a a=0.800 as the Mark-Houwink coefficients. The numerical analyses were performed using Waters "Expert-Ease" software running on a VAX 6410 computer.

DSC melting points were determined on commercial DSC instruments and are reported as the second melting point.

Example 1

In a 100 ml round bottom flask, dimethyl silandiyl bis(2-methyl benzoindenyl zirconiure dichloride (0.025g, 0.044 mmol) was slurried in toluene (20 mls) With stirring, the MAO solution (15.9 mls, 10 wt %, 25.9 mmol Al) was added over ten minutes. Additional toluene (7 mls) was added. This mixture was stirred for thirty five minutes to give a hazy orange mixture. This was filtered through a medium glass frit funnel to give a filtrate that is a crystal clear orange solution. The filter was washed with an additional 15 mls of toluene. To the combined filtrates was added 4.0 g dehydrated silica (800° C.) and this slurry was stirred for 15 minutes, then dried at 40° C. for over two hours. The supported catalyst system was recovered as a light orange solid (4.91 g).

Comparative Example 2

In a 100 ml round bottom flask, dimethyl silandiyl bis(2-methylbenzoindenyl) zirconium, dichloride (0.025 g, 0.044 mmol) was slurried in toluene (20 mls). This gave a yellow slurry which was filtered through a medium glass frit funnel. Since the metallocene had not completely dissolved, the residue had to be washed with a total of 75 mls of toluene to completely dissolve the metallocene. This was added to the MAO solution (15.9 mls, 10 wt %, 25.9 mmol Al) over ten minutes. This mixture was stirred for twenty minutes. To this was added dehydrated silica (800° C.; 4.0 g) and the slurry was stirred for 15 minutes, then dried at 40° C. for over two hours. The supported catalyst was recovered as a light orange solid (4.73 g).

Polymerization

TABLE 1

| Example | Activity (Kg/g cat/hr) | Melting Point(°C.) | Molecular Weight |
|---------|------------------------|---------------------|-------------------|
| 1 | 0.314 | 143.2 | 200,000 |
| 2 | 0.226 | 142.2 | 194,000 |

These examples illustrate that the method of the invention used in Example 1 required only 27 mls. of toluene to dissolve the activated metallocene completely. Impurities were then easily filtered from this solution. This is in contrast to Comparative Example 2 where 100 total mls of toluene were required to dissolve the unactivated metallocene so that impurities could be removed at this point in the process. The catalyst system made using the inventive method was nearly 40% more active than the comparative catalyst system.

Example 3

0.100 g of dimethyl silandiyl bis (2-methylbenzoindenyl) zirconium dichloride (0.173 mmol) was slurried and stirred over fifteen minutes in a 100 ml round bottom flask containing 10 mls MAO (10 wt %, 16.3 mmol Al) to give a hazy orange mixture. This solution was filtered through a medium glass frit funnel to give a tiltrate that was a clear orange solution. The filter was washed with 6 ml toluene. To the combined filtrates 20 mls MAO (10 wt %, 32.6 mmol Al) was added and stirred for 10 min. 4.0 g dehydrated silica (800° C.) was added and the mixture was stirred for thirty minutes, then dried at 45° C. for one hour forty minutes. The supported catalyst system was recovered as a golden yellow solid (5.61 g).

Example 4

0.100 g of dimethyl silandiyl bis (2-methylbenzoindenyl) zirconium dichloride (0.173 mmol) was slurried and stirred over fifteen minutes in a 100 ml round bottom flask containing 10 mls MAO (10 wt %, 16.3 mmol Al) to give a hazy orange mixture. This solution was filtered through a medium glass frit funnel to give a filtrate that was a clear orange solution. The filter was washed with 6 ml toluene. To the combined filtrates 50 mls MAO (10 wt %, 81.5 mmol Al) was added and stirred for 10 min. 4.0 g dehydrated silica (800° C.) was added and the mixture was stirred for thirty minutes, then dried at 40° C. for one hour forty minutes. The supported catalyst system was recovered as a golden yellow solid (8.32 g).

Example 5

0.050 g of dimethyl silandiyl bis (2-methylbenzoindenyl) zirconium dichloride (0.087 mmol) was slurried and stirred in a 100 ml round bottom flask containing 10 mls MAO (10 wt %, 16.3 mmol Al) to give a hazy orange mixture. This solution was filtered through a medium glass frit funnel to give a filtrate that was a clear orange solution. The filter was washed with 6 ml toluene. To the combined filtrates 50 mls MAO (10 wt %, 32.6 mmol Al) was added and stirred for 10 min. 4.0 g alehydrated silica (800° C.) was added and the mixture was stirred for thirty minutes, then dried at 40° C. for one two hours. The supported catalyst system was recovered as a golden yellow solid (7.77 g).

Example 6

0.200 g of dimethyl silandiyl bis (2-methylbenzoindenyl) zirconium dichloride (0.35 mmol) was slurried and stirred 30 minutes in a 100 ml round bottom flask containing 10 mls MAO (10 wt %, 16.3 mmol Al) to give a hazy orange mixture. This solution was filtered through a medium glass frit funnel to give a filtrate that was a clear orange solution. The filter was washed with 7 ml toluene, 5 mls MAO (10 wt %, 8.15 mmol Al), and 3 mls toluene. To the combined clear amber filtrates 5 mls MAO (10 wt %, 8.15 mmol Al) and 5 mls toluene was added. 4.0 g dehydrated silica (800° C.) was added and the mixture was stirred for thirty minutes, then dried at 40° C. for one hour fifty minutes. The supported catalyst system was recovered as a golden orange, free flowing solid (5.10 g).

Example 7

0.041 g of dimethyl silyl bis (2-methylindenyl) zirconium dichloride (0.086 mmol) was added and stirred over eight minutes in a 100 ml round bottom flask containing 6.74 g MAO (30 wt %, 34.7 mmol Al) to give a hazy orange mixture. This solution was filtered through a medium glass frit funnel to give a filtrate that was a clear orange solution. The filter was washed with 14. 1 mls toluene. To the combined filtrates 50 mls MAO (10 wt %, 32.6 mmol Al) was added and stirred for 10 min.. 4.0 g dehydrated silica (600° C.) was added and the slurry was stirred for seventeen minutes, then dried at 40° C. for over two hours. The supported catalyst system was recovered as a light orange solid (5.90 g).

Example 8

0.026 g of dimethyl silandiyl bis (2-methylindenyl) zirconium dimethyl (0.60 mmol) was slurried and stirred ten minutes in a 100 ml round bottom flask containing 3.7 mls MAO (30 wt %, 19.1 mmol Al) to give a hazy orange mixture. This solution was filtered through a medium glass frit funnel to give a filtrate that was a clear orange solution. The filter was washed with 7.4 ml toluene. 2.08 g dehydrated silica (800° C.) was added to the combined filtrates and the mixture was stirred for twenty minutes, then dried at 40° C. for one hour thirty five minutes. The supported catalyst system was recovered as a tan, orange solid (2.58 g).

Example 9

0.065 g of dimethyl silandiyl bis (4-phenyl, 2-methylindenyl) zirconium dichloride (0.103 mmol) was stirred for ten minutes in a 100 ml round bottom flask containing 5.1 g MAO (30 wt %, 26.3 mmol Al) to give a hazy red mixture. This solution was filtered through a medium glass frit funnel. The filter was washed with 16 ml toluene. 4.0 g dehydrated silica (600° C.) was added to the combined filtrates and the mixture was stirred for twenty minutes, then dried at 40° C. for about two hours. The supported catalyst system was recovered as a free flowing pink solid (5.35 g).

Polymerization

TABLE 2

| Example | Activity (Kg/g cat/hr) | Melting Point (°C.) | Mol. Wt. |
|---------|------------------------|---------------------|----------|
| 3 | 2.53 | 144.4 | 184,000 |
| 4 | 2.62 | 144.2 | 172,000 |
| 5 | 1.66 | 143.8 | 175,000 |
| 6 | 1.38 | 144.8 | 193,000 |
| 7 | 1.95[a] | 148.7 | 145,000 |
| 8 | 2.00 | 146.5 | 160,000 |
| 9 | 1.44[a] | 149.5 | 281,000 |

[a]Polymerization time was 60 minutes.

While the present invention has been described and illustrated by reference to preferred embodiments, it will be appreciated by those of ordinary skill in the art that the invention described herein lends itself to variations not necessarily illustrated herein.

What is claimed is:

1. A method for producing a metallocene catalyst system, said method comprising the steps of:

1) providing one or more metallocene compounds;
   2) combining the metallocene compound(s) with an alkylalumoxane in a solvent to form a metallocene catalyst system solution; and then
   3) removing insoluble impurities from the solution.

2. The method of claim 1 wherein the activator is methylalumoxane and the metallocene is represented by the formula:

wherein M is selected from the group consisting of titanium, zirconium, hafnium, vanadium niobium, tantalum, chromium, molybdenum and tungsten;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different are one of a halogen atom, a $C_1$–$C_{10}$ alkyl group which may optionally be halogenated, a $C_6$–$C_{10}$ aryl group which may optionally be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is $$-M^2-,\ -M^2-M^2-,\ -M^2-(CR_2^{13})-,$$
(with $R^{11}$ above and $R^{12}$ below each $M^2$)

$$-O-M^2-O-,\ -C-,\ -O-M^2-$$
(with $R^{11}$ above and $R^{12}$ below)

$=BR^{11}$, $=AlR^{11}$, —Ge—, —Sn—, —O—, —S—, $=SO$, $=SO_2$, $=NR^{11}$, $=CO$, $PR^{11}$, or $=P(O)R^{11}$;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroalkyl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin, preferably silicon or germanium;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

3. The method of claim 1 wherein the metallocene is selected from the group consisting of rac-dimethylsilandiylbis(2-methyl-4,5-benzoindenyl) zirconium dichloride, rac-dimethylsilandiylbis(2-methylindenyl)zirconium dichloride, rac dimethylsilandiyl-bis(2-methyl-4,6-diisopropylindenyl)zirconium dichloride, rac-dimethylsilandiylbis(2-methyl-4-phenylindenyl) zirconium dichloride, rac-dimethylsilandiylbis(2-ethyl-4-phenylindenyl)zirconium dichloride, rac-dimethylsilandiylbis(2-methyl-4(1-naphthylindenyl) zirconium dichloride, and rac-dimethylsilandiylbis(2-methyl-alpha-acenapthyl)indenyl zirconium dichloride.

4. A method for producing a metallocene catalyst system, said method comprising the steps of:

(a) activating one or more metallocene compounds having limited solubility in a hydrocarbon solution thereby solubilizing the metallocene compound(s); then
   (b) filtering the solution;
   (c) combining the solution with support material; and
   (d) recovering activated metallocene catalyst system.

5. The method of claim 4 wherein the metallocene is a bis indenyl metallocene and wherein the activating step is accomplished using methylalumoxane.

6. A method for producing a supported metallocene catalyst system, said method comprising the steps of:

(a) combining in a hydrocarbon solvent, one or more metallocene compounds having limited solubility in the solvent with an activator to form a solution; then
   (b) removing solid components from the solution; then
   (c) combining the solution with a support material; and (d) recovering active, supported metallocene catalyst system.

7. The method of claim 6 further comprising the step of prepolymerizing the catalyst system.

8. The method of claim 6 wherein the activator is methylalumoxane and wherein the metallocene is represented by the formula:

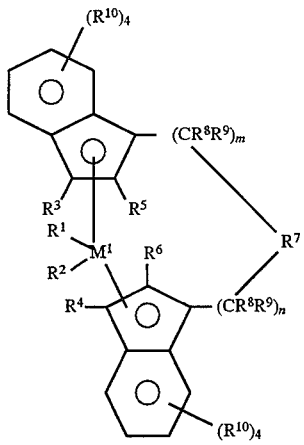

wherein $M^1$ is a metal of group 4, 5, or 6 of the Periodic Table, $R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different and are one of a halogen atom, a $C_1$–$C_{10}$ alkyl group, which may optionally be halogenated, a $C_6$–$C_{10}$ aryl group, which may optionally be halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

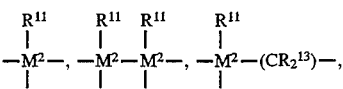

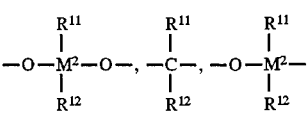

$=BR^{11}, =AlR^{11}, —Ge—, —Sn—, —O—, —S—, =SO,$
$=SO_2, =NR^{11}, =CO, PR^{11},$ or $=P(O)R^{11}$;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings as stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ wherein further two adjacent $R^{10}$ radicals can be joined together to form a ring system.

* * * * *